United States Patent [19]
Piper

[11] 3,904,092
[45] Sept. 9, 1975

[54] UNIVERSAL SKI RACK

[76] Inventor: Paul Alfred Piper, 1150 Balclutha Dr., Foster City, Calif. 94404

[22] Filed: Sept. 13, 1973

[21] Appl. No.: 396,906

[52] U.S. Cl. ........ 224/29 R; 224/42.1 F; 248/226 A
[51] Int. Cl.² .......................................... B60R 9/12
[58] Field of Search ........ 224/42.1 G, 29 R, 42.1 F; 280/11.37 K, 11.37 A; 248/51, 226 A

[56] References Cited
UNITED STATES PATENTS

| 3,369,247 | 2/1968 | Bacon | 248/226 A X |
| 3,480,242 | 11/1969 | Cleveland | 248/226 A |
| 3,695,495 | 10/1972 | Parsons | 224/29 R |
| 3,726,410 | 4/1973 | Binding et al. | 280/11.37 K X |

FOREIGN PATENTS OR APPLICATIONS

| 227,104 | 4/1963 | Austria | 224/42.1 G |

*Primary Examiner*—Robert J. Spar
*Assistant Examiner*—Jerold M. Forsberg
*Attorney, Agent, or Firm*—Townsend and Townsend

[57] ABSTRACT

A ski rack which can be used on most types of slope-backed vehicles is disclosed. The ski rack is adapted to attach to the edge of the trunk lid or similar planar edge portion of the vehicle. The rack includes a support member to which the skis are attached, and a clamp for mounting the support member on the vehicle. The clamp has one end attached to the support member and a second opposite end which detachably attaches to the planar edge portion of the vehicle. The second end has a first planar member adapted to abut the underside of the edge portion, and a second planar member in parallel spaced opposition to the first planar member and adapted to abut the upper surface of the edge portion opposite the first planar member. Means are provided for urging the second planar member toward the first planar member to engage the edge portion therebetween. The first planar member has a lateral edge adapted to be adjacent a support rib on the underside of the planar edge portion, and the second planar member is adapted to span the support rib so that the clamp is at least partially supported by the rib, thereby providing a rigid support for the ski rack.

11 Claims, 5 Drawing Figures

PATENTED SEP 9 1975
3,904,092
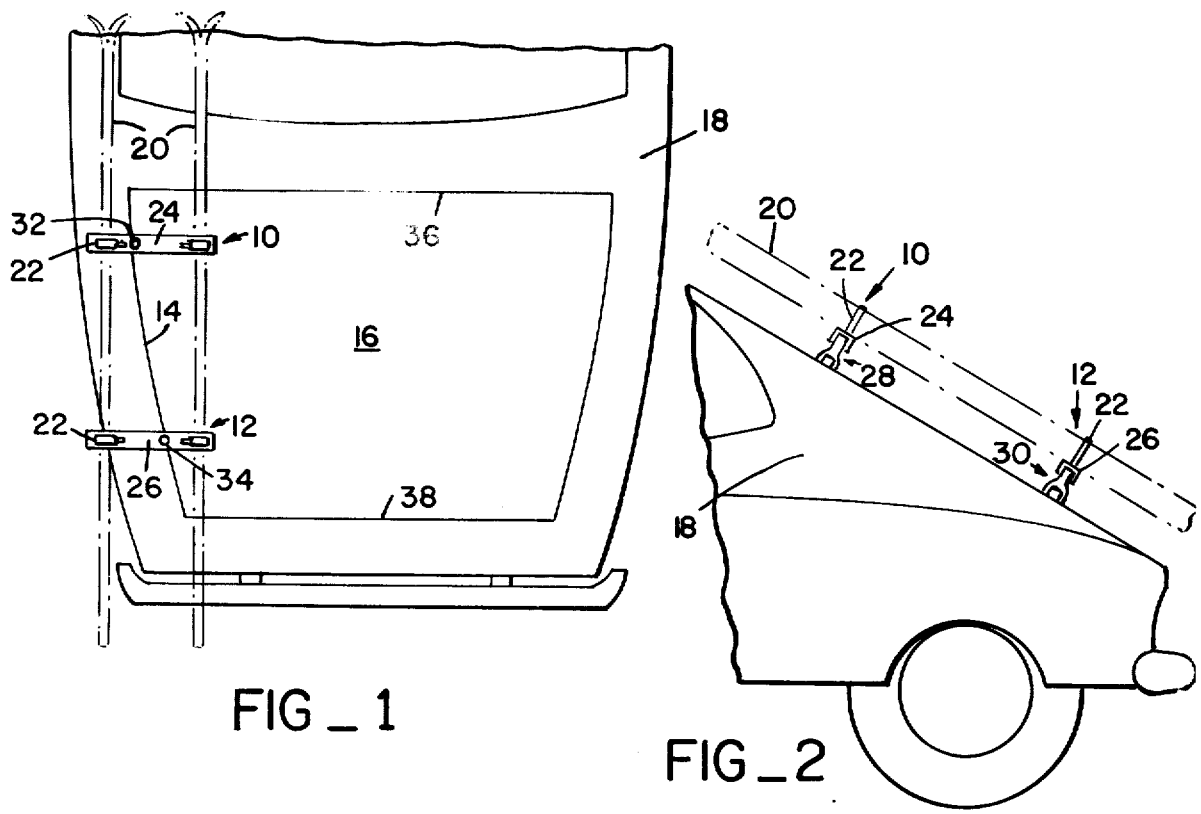
FIG_1
FIG_2
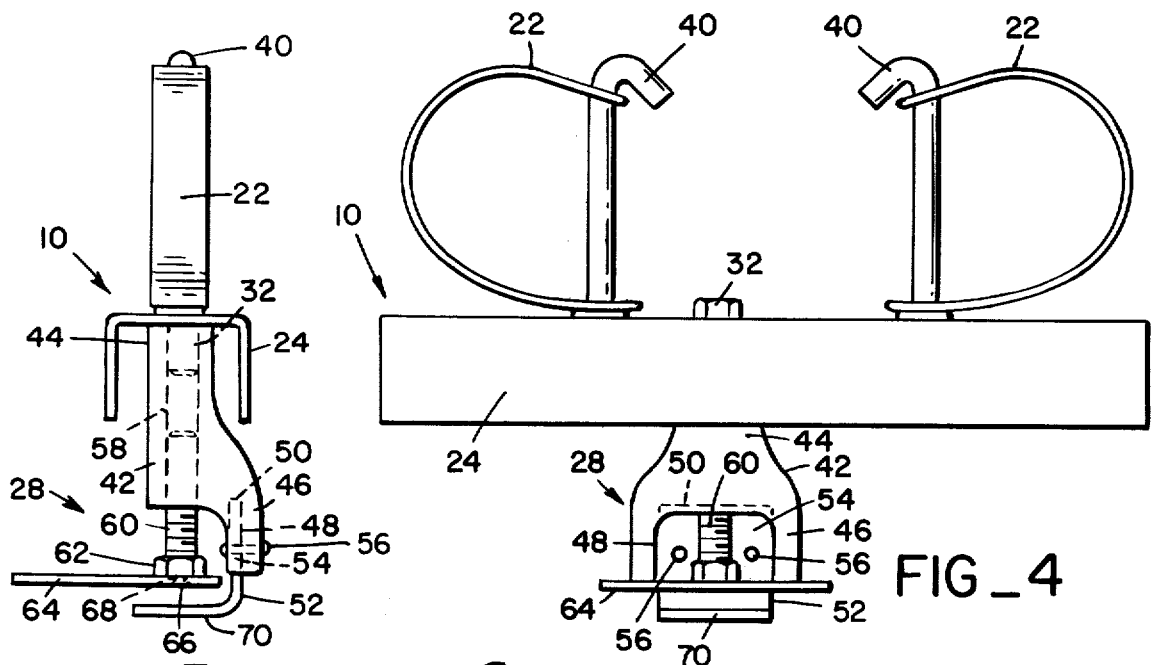
FIG_3
FIG_4
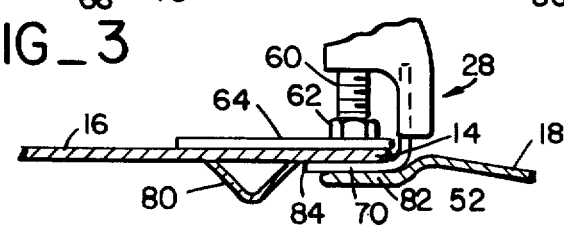
FIG_5

UNIVERSAL SKI RACK

BACKGROUND OF THE INVENTION

The present invention relates to ski racks, and in particular to ski racks for slope-backed vehicles.

A variety of ski racks are available for carrying skis over the roof portion of a vehicle. These ski racks attach to the rain gutters on the edges of the roof of the vehicle, and are usually adjustable for use on most vehicles which have the required rain gutters. However, for fastback or slope-backed vehicles, which are becoming increasingly popular, it is usually desirable to mount the skis on the sloping aft portion of the vehicle rather than over the roof. Since rain gutters are not provided on this aft portion, devising a universal ski rack, i.e. one that fits a wide variety of automobiles, has been a difficult problem since there is no convenient way to attach the rack to the vehicle.

Some ski racks found in the prior art for carrying skis on the rearward portion of the slope-backed automobile employ either a spaced pair of support members or a unitary frame which simply bolts on to the vehicle, as illustrated in the patent to Bott, U.S. Pat. No. 3,610,491. Such ski racks cannot be conveniently removed from the vehicle since the bolt holes must be filled, and are thus usually left on the vehicle, even in the summer. This type of ski rack is unacceptable to persons who wish to remove their ski racks when the ski season ends.

Other types of ski racks, as exemplified in the patent to Gjesdahl, U.S. Pat. No. 3,606,111, and the patent to Allen, U.S. Pat. No. 3,710,999, employ a frame having underlying suction cups which rest on the surface of the vehicle. The frame is attached to the vehicle by means of straps which extend from the frame to the edges of the trunk lid, and tightening the straps maintain the suction cups in contact with the vehicle. The problem with this type of ski rack is that the suction cups slide relative to the vehicle, and the friction between the cups and the vehicle causes rings or marks which mar the finish of the vehicle when the ski rack is removed.

The above types of ski racks are not limited to a specific type of automobile. However, removal of the bolted type of ski rack is inconvenient, and the suction cup type leaves marks which detract from the appearance of the vehicle. In order to avoid these deficiencies, it has become customary to design individual ski racks for each different model of automobile. In such ski racks, the shape and size of the frame is matched to the shape of the trunk opening of the vehicle. The frame is thus readily attachable to the edge of the trunk opening, and can easily be removed. The frame itself provides the desired structural rigidity so that excessive loads are not placed on the edges of the trunk opening, and the finish of the automobile is not damaged. However, such ski racks are not adaptable to different makes of cars, and are often restricted to a given model year or set of years. Hence, the useful life of such a ski rack is usually limited to the life of the automobile.

Attempts have been made to develop ski racks that can be adapted to different types of vehicles, but that do not require bolts or suction cups to support the frame. However, such devices are generally impractical because the mode of attachment of the frame to the vehicle is insufficient to provide structural rigidity required when skis are subjected to relatively strong wind forces during transit. Universal clamping mechanisms presently available have been unable to provide the necessary rigidity and often damage the point of attachment to the vehicle. As a result, such ski racks are not in common usage.

SUMMARY OF THE INVENTION

The present invention provides a universal ski rack adapted to fit virtually all slope-backed vehicles that have a trunk or hatch opening in the back. The ski rack of this invention includes a support member, and means for attaching skis to the support member. A clamp is provided that has one end attached to the support member and a second opposite end adapted to detachably attach to the planar edge portion of a vehicle, such as the edge of the trunk lid. The second end includes a first planar member adapted to abut the underside of the edge portion and a second planar member in parallel spaced opposition to the first planar member and adapted to abut the upper surface of the edge portion opposite the first planar member. Means are provided for urging the second planar member toward the first planar member to engage the edge portion therebetween to fix the ski rack to the vehicle. The clamp attaches firmly to the vehicle so that it cannot slide relative thereto to prevent marring the finish of the vehicle.

In the preferred embodiment of the present invention, the first planar member has a lateral edge adapted to be maintained adjacent a support rib on the underside of the planar edge portion of the vehicle. The second planar member spans the support rib so that the clamp is at least partially supported by the rib. Thus, the ski rack is not attached merely to the skin or sheet metal of the vehicle, but is also attached to the support rib. The support rib provides a structurally sound attachment of the ski rack to the vehicle so that the ski rack is capable of withstanding the wind resistance on the skis without damaging the vehicle.

In using the ski rack of the present invention, two separate rack assemblies are ordinarily attached to the vehicle, one rack supporting the tips of the skis and the other rack supporting the rear portion of the skis. The two racks of the present invention can be attached to the upper and lower edges respectively of the trunk portion of the vehicle. As an alternative, both of the ski racks can be attached to the side edge of the trunk lid, or one or the other of the ski racks could be so attached.

In the preferred embodiment of the present invention, the support member is selectively rotatable with respect to the clamp so that the orientation of the support member does not depend on the orientation of the trunk lid or other attachment edge. Thus, the ski rack can be attached to any portion of the trunk opening and the skis still aligned with the direction of travel of the vehicle, allowing the ski rack to be used on almost any slope-backed vehicle.

In the preferred embodiment of the present invention the support member is elongate and the attachment of the clamp to the support member is offset from the longitudinal center of the support member. Thus, if the two ski racks of the present invention are attached along a side edge of a trunk lid which is not aligned with the direction of travel of the vehicle, one of the ski racks can be rotated in one position and the other ski rack rotated on the other position to align the skis with the direction of travel of the vehicle.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a top view of the aft portion of an automobile employing the ski rack of the present invention;

FIG. 2 is a fragmentary side elevation view of the aft portion of the automobile of FIG. 1;

FIG. 3 is a side elevation view of the ski rack of the present invention;

FIG. 4 is a rear elevation view of the ski rack of FIG. 3;

FIG. 5 is a fragmentary elevation view illustrating the attachment of the clamp portion of the ski rack to the trunk edge of a vehicle.

DESCRIPTION OF THE PREFERRED EMBODIMENT

The use of the ski rack of the present invention to carry two pairs of skis on the sloping aft portion of slope-backed automobiles is illustrated by way of reference to FIGS. 1 and 2. The ski rack includes two separate basically identical rack portions 10 and 12 mounted on the planar edge 14 of the trunk lid 16 of vehicle 18. Racks 10 and 12 are spaced along planar edge 14, rack 10 connected to the forward portion of skis 20 and rack 12 attached to the aft portion of the skis. Skis 20 are attached to racks 10 and 12 by means of loops 22 known in the art.

The support member portion 24, 26 of the ski racks 10 and 12 are attached to clamp portions 28, 30 by means of bolts 32, 34. Support members 24, 26 are rotatable about bolts 32, 34, and the attachment of clamps 28, 30 to the support members is offset from the longitudinal center of the support members. Hence, support members 24, 26 can alternatively be extended to the right and the left as illustrated to align skis 20 with the direction of travel of vehicle 18, even though lateral edge 14 of trunk lid 16 is not so aligned. Also, as an alternative, clamps 28, 30 could have been attached to the upper and lower edges 36, 38 of trunk lid 16 by rotating clamps 28, 30, 90° with respect to support members 24, 26. Hence, the ski racks 10 or 12 of the present invention can readily be attached to different size and shape trunk or hatch openings of slope-back vehicles merely by rotating support member 24, 26 with respect to clamps 28, 30. Clamps 28, 30 can be attached to any edge of the trunk lid or any other like opening, as will hereinafter be more fully illustrated.

The construction of the ski rack itself is illustrated in more detail by way of reference to FIGS. 3 and 4. Reference numerals corresponding to the forward ski rack 10 illustrated in FIGS. 1 and 2 will be used for clarity. Conventional attachment loops 22 are releasably connected to hooks 40 for attachment of two pair of skis to ski rack 10. Hooks 40 are connected to the outer surface of the base portion of support member 24, preferably having the U-shaped cross section illustrated. The U-shaped cross section provides a smooth exterior to minimize damage to the skis as they are attached to the support member.

Clamp 28 includes an armature 42 which has a neck portion 44 attached to the interior surface of the base of support member 24 at one end. Armature 42 also has a shoulder portion 46 at the other end of neck portion 44 which is axially offset from the neck portion. Shoulder portion 46 has an outwardly directed recess 48, and a downwardly directed elongate slot 50 at the upper end of the recess. An L-shaped member 52 has one flange 54 adapted to mate with recess 48 and fit into slot 50. Rivets 56 attach flange 54 of L-shaped member 52 to the shoulder portion 46 of armature 42, and in combination with recess 48 and slot 50 firmly attach the L-shaped member to the armature.

Neck portion 44 of armature 42 has a axial aperture 58 extending therethrough. Downwardly projecting bolt 32 engages the upper end of neck portion 44 of armature 42 to attach support member 34 thereto. Bolt 32 can be loosened to allow support member 34 to rotate relative to clamp 28. Also, the position of bolt 32 is longitudinally offset from the longitudinal center of support member 24 so that rotation of the support member changes its lateral position relative to clamp 48 as illustrated in FIG. 1.

Upwardly projecting bolt 60 is threadably engagable with aperture 58 at the lower end of neck portion 44. Bolt 60 has a head portion 62 at the lower end thereof for turning the bolt. A planar member 64 is rotatably attached to head 62 by means of a tapered rivet 66 which fits in a counter-sunk aperture 68 in the planar member so that the head of the rivet is flush with the lower surface of the planar member. Planar member 64 is thus in parallel spaced opposition to the second flange 70 of L-shaped member 52. The opposing planar surfaces of member 64 and flange 70 are preferably rubberized to protect the finish of that edge portion of the vehicle engaged therebetween.

The attachment of clamp 28 (or 30) to the planar edge portion 14 of trunk lid 16 is illustrated by way of reference to FIG. 5. Trunk lid 16 has an elongate rib 80 which runs adjacent lateral edge 14 thereof. Such a support rib is ordinarily provided on a trunk or other similar lid to provide stiffness to the sheet metal lid. Also, the body of the vehicle 18 has a lip 82 which underlies lateral edge 14 of trunk lid 16 to provide a continuous outer surface for the vehicle and to prevent rain from entering the trunk. The lower flange 70 of L-shaped member 52 is adapted to fit in the gap between lip 82 and planar edge 14. Flange 70 has a lateral edge 84 which is adapted to be adjacent rib 80. Such ribs are generally approximately ¾ inch to 1 inch from edge 14, so that the preferred lateral extent of flange 70 is approximately ¾ inch.

Planar member 64, which is generally in parallel spaced opposition to flange 70 of L-shaped member 52, is urged into contact with lateral edge 14 of trunk lid 16 by bolt 60. Bolt 60 can be rotated by a wrench or pliers engaged with head 62. Planar member 64 has a portion adapted to be in parallel spaced opposition to flange 70, and an extended portion overlying rib 80. The transverse dimension of planar member 64 is such that the planar member spans a substantial portion of the rib (See FIG. 4.) In this manner, clamp 28 is at least partially supported by rib 80, rather than merely by edge 14 of trunk lid 16, providing a rigid support capable of withstanding the substantial forces caused by wind resistance on the skis.

While a preferred embodiment of the present invention has been illustrated in detail, it is apparent that modifications and adaptations of that embodiment will occur to those skilled in the art. For example, the clamp portion of the present invention could be utilized to attach luggage racks or any other type of rack to the trunk lid of a slope-backed automobile. Also, ski racks could be devised wherein one rack portion is designed according to the principles of the present invention, and the other rack portion has a different construction and attaches to the bumper of the vehicle. Another obvious application of the present invention would be to mount skis transversely on the trunk portion of a standard (non-slope-backed) vehicle. However, it is to be expressly understood that such modifications and adaptations are within the spirit and scope of the present invention, as set forth in the following claims.

I claim:

1. A ski rack adapted to attach to the edge of a trunk lid or similar planar edge portion of a vehicle having an underlying support rib proximate said edge, said rack comprising: a support member; means for attaching skis to said support member; and a clamp having one end attached to the support member and a second opposite end adapted to detachably attach to said planar edge portion of said vehicle, said second end including a first planar member adapted to abut the underside of said edge portion and having a lateral edge adapted to be maintained adjacent the support rib on the underside of said planar edge portion, a second planar member in parallel spaced opposition to the first planar member and adapted to abut the exposed upper surface of said edge portion generally opposite said first planar member, said second planar member having a portion adapted to overlie said support rib so that said clamp is at least partially supported by said rib, the portion of the second planar member adapted to overlie said support rib having a relatively wide transverse dimension to overlie a substantial portion of said support rib to provide transverse support of said clamp by said support rib, and means for urging the second planar member toward the first planar member to engage the edge portion therebetween and secure the clamp to said edge portion.

2. A ski rack as recited in claim 1 wherein the support member comprises a U-shaped channel, and wherein said one end of the clamp is attached interiorly of said channel to the base thereof, and wherein the means for attaching skis to said support member is located on the exterior surface of the base of said channel.

3. A ski rack as recited in claim 1 wherein said one end of the clamp is detachably attached to said support member.

4. A ski rack as recited in claim 1 wherein the support member is generally elongate, and wherein said one end of the clamp is selectably rotatably attached to the elongate support member for mounting skis to said support member at an oblique angle to the planar edge portion of the vehicle.

5. A ski rack as recited in claim 4 wherein the attachment of said one end of said clamp to the elongate support member is offset from the longitudinal center of said support member.

6. A ski rack adapted to attach to the edge of the trunk lid or similar planar edge portion of a vehicle having an underlying support rib, said rack comprising:
an elongate support member having a generally U-shaped cross section;
means for attaching skis to said support member, said attachment means located on the exterior surface of the base of said support member;
a clamp for attaching the support member to the planar edge portion of the vehicle, said clamp including an armature comprising an elongate neck portion and a shoulder portion axially offset from said neck portion, said neck portion having one end adapted to be attached to the interior surface of the base of the support member and an internally threaded aperture extending longitudinally through said neck portion, a downwardly projecting bolt threadably engagable with said aperture at said one end of said neck portion for attaching the support member to said neck portion, and L-shaped member depending from the shoulder portion of the armature and having a first flange attached to said armature and a second flange generally perpendicular to the axis of said aperture, said second flange of the L-shaped member having a lateral edge adapted to abut the support rib on the underside of the planar edge portion of the vehicle, an upwardly projecting bolt having one end threadably engaged with the threaded aperture opposite said one end of said neck portion, and a planar member rotatably attached to the upwardly projecting bolt adjacent the other end of said upwardly projecting bolt, said planar member having at least a portion adapted to be generally in parallel spaced opposition to the second flange of the L-shaped member so that rotation of the upwardly projecting bolt moves the planar member with respect to the L-shaped member, said planar member adapted to overlie a substantial portion of said support rib so that the support member is at least partially supported by said support rib, so that the planar edge portion of the vehicle can be releasably secured therebetween for attachment of the support member to the vehicle.

7. A ski rack as recited in claim 6 wherein the attachment of the neck portion of the armature is longitudinally offset from the longitudinal center of the elongate support member, said support member being selectably rotatable about the downwardly projecting bolt attaching the support member to the neck portion so that the transverse position of the support member relative to the planar edge portion of the vehicle is selectable.

8. A ski rack system adapted to attach to the edge of a trunk lid or similar planar edge portions of a vehicle, said rack comprising a pair of discrete ski racks, each ski rack including an elongate support member, means for attaching skis to each said support member, and a pair of clamps attached to the respective support member, each said clamp having one end selectively rotatably attached to the support member offset from the longitudinal center of said support member and a second opposite end adapted to detachably clamp to a planar edge portion of the vehicle, so that the ski racks can be attached in spaced relationship to planar edge portions of the vehicle and the support members thereof selectively rotated so that skis mounted in said ski racks are aligned with the direction of travel of the vehicle.

9. A ski rack system as recited in claim 8 wherein the second opposite end of the clamps each comprise a first planar member adapted to abut the underside of the edge portion, a second planar member in parallel spaced opposition to the first planar member and adapted to abut the exposed upper surface of said edge portion opposite said first planar member, and means for urging the second planar member toward the first planar member to engage the edge portion therebetween and secure the clamp to said edge portion.

10. A ski rack system as recited in claim 9 wherein the planar edge portions of the vehicle have an underlying support rib proximate said edge, wherein the first planar members of the clamps each include a lateral edge adapted to be maintained adjacent the support rib on the underside of the planar edge portion, and wherein the second planar member of each clamp has a portion adapted to overlie the support rib so that the clamp is at least partially supported by the rib, the portion of the second planar member adapted to overlie the support rib having a relatively wide transverse dimension to overlie a substantial portion of said support rib to provide transverse support of the associated clamp by the support rib.

11. A ski rack system adapted to attach to the edge of a trunk lid or similar planar edge portions of a vehicle having underlying support ribs proximate said edges, said system comprising a pair of discrete ski racks, each ski rack including an elongate support member, means for attaching skis to said support member, and a clamp having one end selectively rotatably attached to the support member offset from the longitudinal center of said support member and a second opposite end adapted to detachably attach to a planar edge portion of the vehicle, the second opposite ends of the clamps each comprising a first planar member adapted to abut the underside of the edge portion of the vehicle and having a lateral edge adapted to be maintained adjacent the support rib, and a second planar member in parallel spaced opposition to the first planar member and adapted to abut the exposed upper surface of said edge portion generally opposite said first planar member, the second planar member of each clamp having a portion adapted to overlie the support rib so that the clamp is at least partially supported by the rib, the portion of the second planar member adapted to overlie said rib having a relatively wide transverse dimension so as to overlie a substantial portion of said support rib, the ski racks adapted to be attached in spaced relationship to the planar edge portions of the vehicle and the support members thereof selectively rotated so that skis mounted in said ski racks are aligned with the direction of travel of the vehicle.

* * * * *